(12) United States Patent
Lin et al.

(10) Patent No.: US 8,269,912 B2
(45) Date of Patent: Sep. 18, 2012

(54) DISPLAY DEVICE FOR PREVENTING ELECTROMAGNETIC INTERFERENCE

(75) Inventors: Huang-Pin Lin, Taipei County (TW);
Chien-Cheng Lin, Taipei County (TW);
Jian-Lin Chen, Taipei County (TW);
Kuan-Yu Chen, Taipei County (TW);
Yi-An Chien, Taipei County (TW);
Hung-Tsai Weng, Taipei County (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 863 days.

(21) Appl. No.: 12/389,382

(22) Filed: Feb. 20, 2009

(65) Prior Publication Data
US 2010/0214199 A1    Aug. 26, 2010

(51) Int. Cl.
*G09G 3/32* (2006.01)
(52) U.S. Cl. ............................................. 349/59
(58) Field of Classification Search ............... 345/102; 349/58–59
See application file for complete search history.

(56) References Cited

U.S. PATENT DOCUMENTS
2006/0197101 A1*   9/2006   Wu ..................................... 257/99
2007/0146570 A1*   6/2007   Yu et al. ............................ 349/58

FOREIGN PATENT DOCUMENTS
TW   200725073   7/2007
TW   M345457    11/2008

OTHER PUBLICATIONS

"Office Action of Taiwan Counterpart Application", issued on Mar. 5, 2012, p. 1-p. 7.

\* cited by examiner

*Primary Examiner* — Quan-Zhen Wang
*Assistant Examiner* — Tony Davis
(74) *Attorney, Agent, or Firm* — Jianq Chyun IP Office

(57) ABSTRACT

A display device includes a display panel, a back light module, a printed circuit board and a ground slice. The back light module includes a first frame, a second frame and a light source disposed between the first frame and the second frame. The first frame has a first side plate having an opening, and the second frame has a second side plate opposite to the first side plate. The printed circuit board includes a control circuit electrically connected to the display panel. The printed circuit board is disposed at a side of the back light module, and the control circuit is disposed at the outer side of the first side plate and the second side plate, such that the control circuit is opposite to the second side plate through the opening. The ground slice is connected between the control circuit and the second side plate through the opening.

19 Claims, 3 Drawing Sheets

DISPLAY DEVICE FOR PREVENTING ELECTROMAGNETIC INTERFERENCE

BACKGROUND OF THE INVENTION

1. Field of the Invention

The present invention generally relates to a display device. More particularly, the present invention relates to a display device for preventing electromagnetic interference.

2. Description of Related Art

The modern life style has called for a thinner and lighter display apparatus. Although the traditional display apparatus made of cathode ray tubes has its own advantages, its bulky size and the radiation emitted during display is still a problem. As a result, a new development combining optoelectronics and semiconductor manufacturing technologies, the flat panel display (FPD), including liquid crystal display (LCD), organic electro-luminescent display (OELD) and plasma display panel (PDP), has become the mainstream display product.

Referring to FIG. 1 which is a partially cross-sectional views schematically illustrating a flat display device 100, a conventional control circuit 110 is electrically connected to an outer frame 120 through a conductive sponge 112 to conduct the high frequency signal generated by the control circuit 110 to the outer frame 120, such that the interference from the high frequency signal to other electrical elements is prevented. The outer frame 120 is a bezel of the flat display device 100 and can be a metal frame. A plastic frame with colorful paint is used to cover the metal frame commonly for aesthetic feeling. The outer frame 120 can be electrically connected to the second frame 132 of the back light module 130 by another conductive sponge or a fastening element (such as a screw) to conduct the high frequency signal to the second frame 132 through the outer frame 120 for grounding. Referring to FIG. 1, the control circuit 110 and the connector 114 disposed on the conventional printed circuit board 108 both front the outer frame 120 (the control circuit 110 and the connector 114 are both disposed on the same surface of the printed circuit board 108). The other surface of the printed circuit board 108 is near the back light module 130, and the printed circuit board 108 and the second frame 132 are separated by the first frame 134 of the back light module 130, such that the ground terminal of the control circuit 110 need to be passed through the outer side of the outer frame 120 for being connected to the second frame 132 of the back light module 130. The transmitting path is longer in this situation and the influence of electromagnetic interference can not be decreased.

SUMMARY OF THE INVENTION

The present invention is directed to a display device for preventing electromagnetic interference, such that the interference from the high frequency signal to other electrical elements is prevented.

As embodied and broadly described herein, the present invention provides a display device including a display panel, a back light module, a printed circuit board and a ground slice is provided. The back light module includes at least one light source, a first frame and a second frame, wherein the first frame is opposite to the second frame, the light source is disposed between the first frame and the second frame, wherein the first frame has a first side plate, the second frame has a second side plate, the first side plate is opposite to the second side plate, and the first side plate has at least an opening. The printed circuit board includes a control circuit electrically connected to the display panel, wherein the printed circuit board is disposed at a side of the back light module, and the control circuit is disposed at the outer side of the first side plate and the second side plate, such that the control circuit is opposite to the second side plate through the opening. The ground slice is connected between the control circuit and the second side plate through the opening.

According to an embodiment of the present invention, the display device further includes a flexible printed circuit, electrically connected between the printed circuit board and the display panel.

According to an embodiment of the present invention, the control circuit includes a timing control circuit.

According to an embodiment of the present invention, the printed circuit board further has a connector, and the connector and the control circuit are disposed at two opposite surfaces of the printed circuit board.

According to an embodiment of the present invention, the first frame is a plastic frame.

According to an embodiment of the present invention, the second frame is a metal frame.

According to an embodiment of the present invention, the light source is a lamp or a light emitting diode.

According to an embodiment of the present invention, the ground slice includes a conductive sponge.

According to an embodiment of the present invention, the ground slice includes a conductive silica gel.

According to an embodiment of the present invention, the display panel includes a liquid crystal display panel.

In summary, the control circuit of the present invention is disposed at a surface of the printed circuit board and outer side of the opening of the first side plate, and there is only the connector and the ground circuit disposed on the other surface of the printed circuit board. When the printed circuit board is assembled to the display device, the high frequency signal generated by the control circuit is directly conducted to the second frame of the back light module through the ground slice, such that the signal transmitting path is shortened and the interference from the high frequency signal to other electrical elements is prevented.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
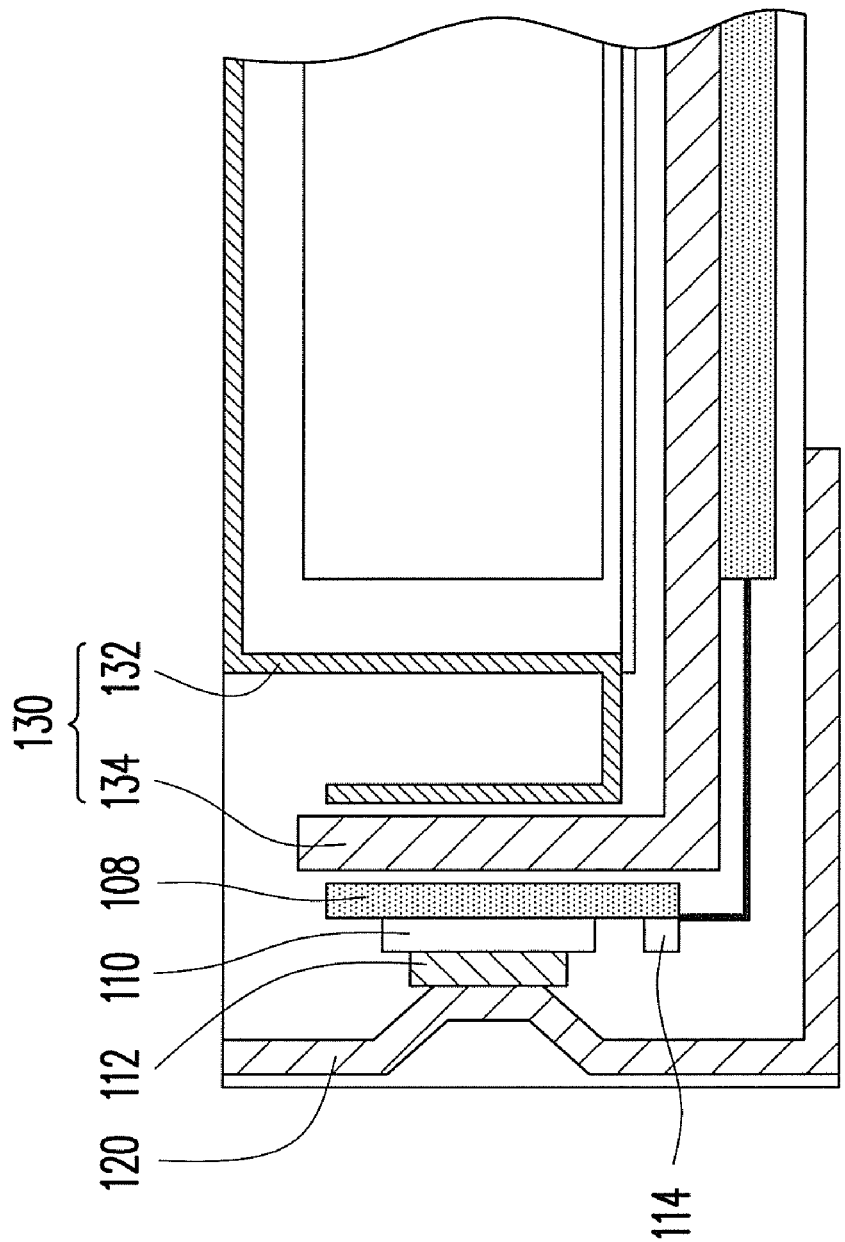
FIG. 1 is a partially cross-sectional view showing a conventional display device.

Reference will now be made in detail to the present embodiments of the invention, examples of which are illustrated in the accompanying drawings. Wherever possible, the same reference numbers are used in the drawings and the description to refer to the same or like parts.

Figure 2:
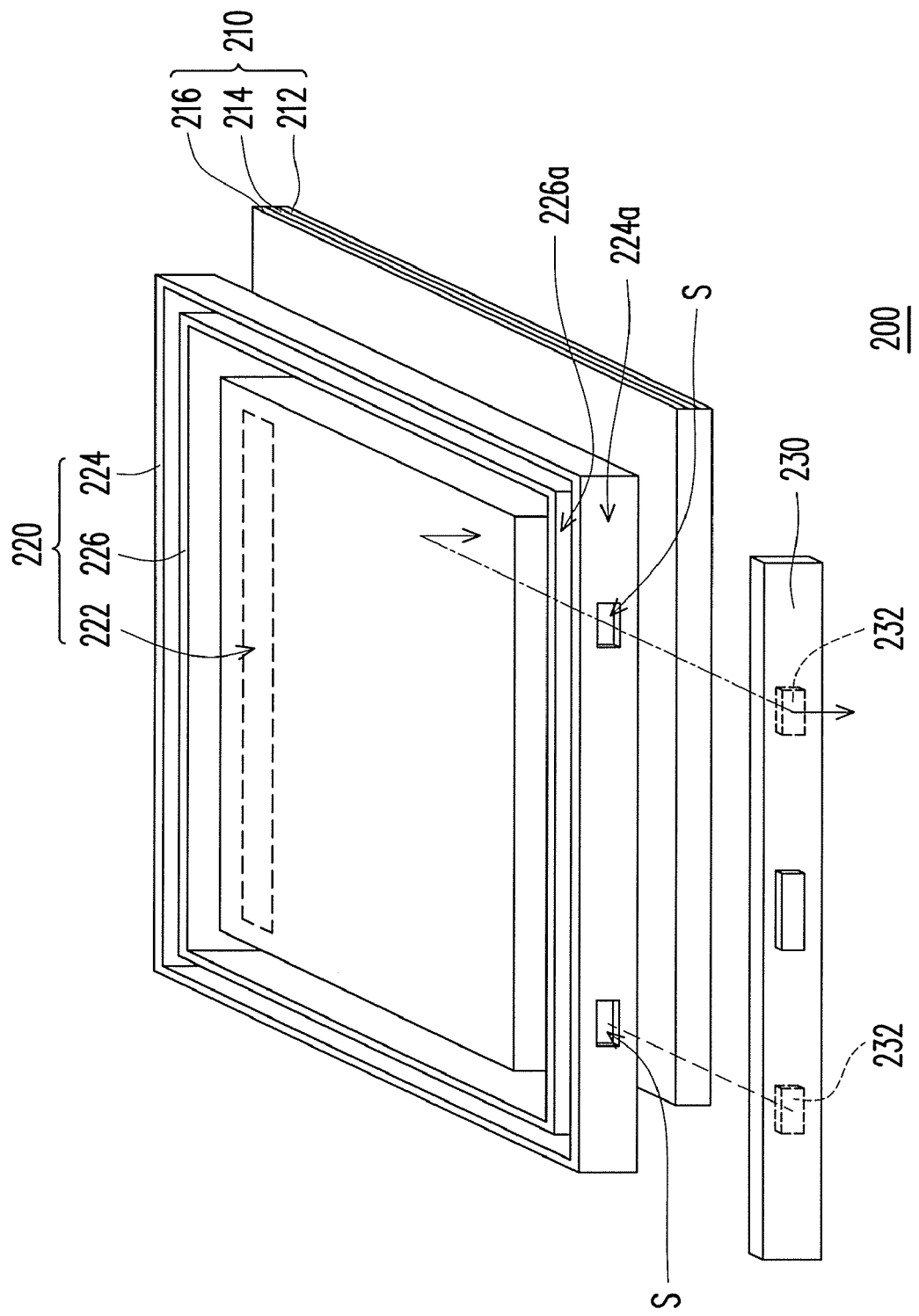
FIG. 2 is an exploded view showing an embodiment of the display device of the present invention.
Figure 3:
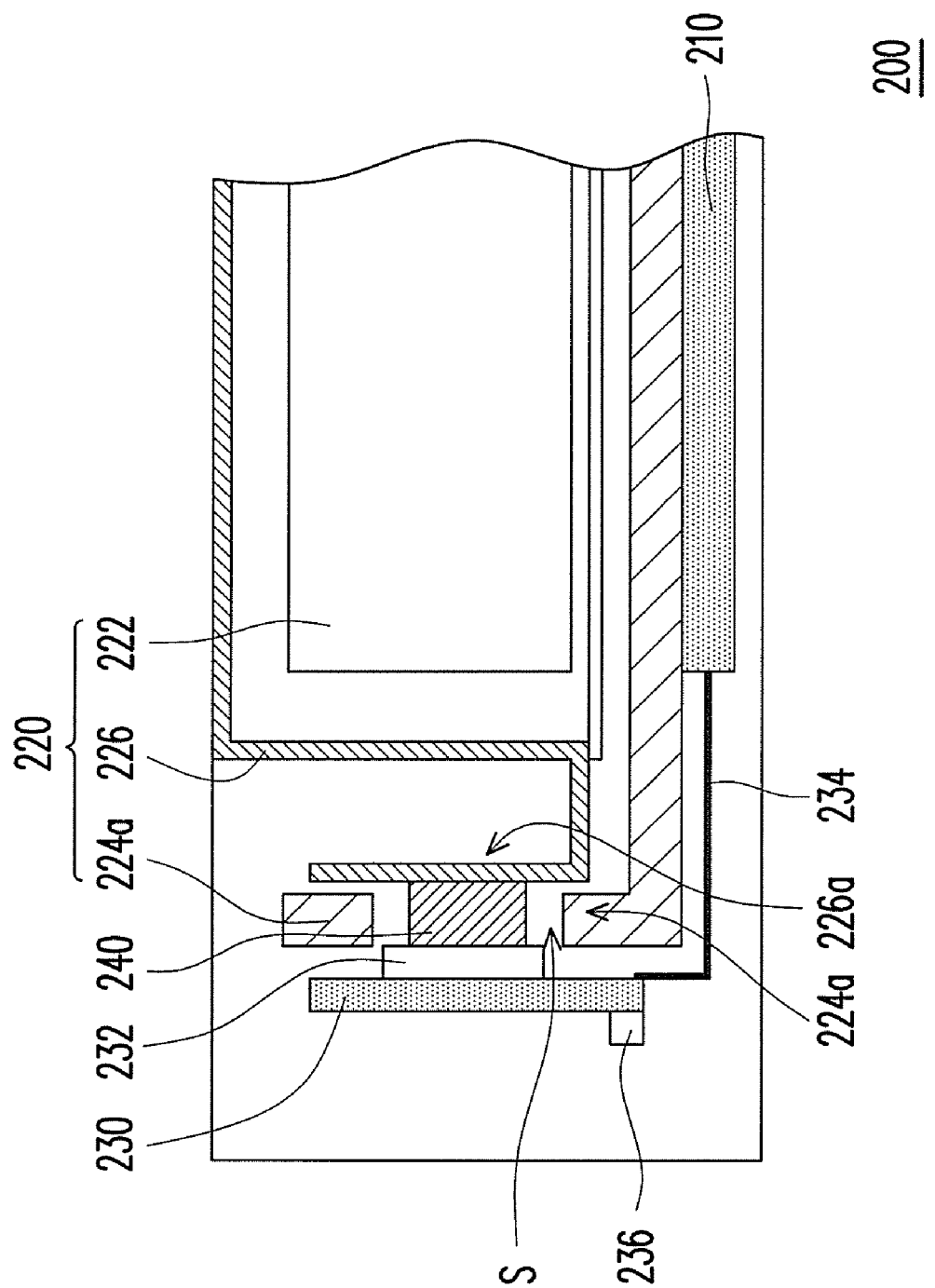
FIG. 3 is a partially cross-sectional view showing the display device in FIG. 2.

FIG. 2 is an exploded view showing an embodiment of the display device of the present invention. FIG. 3 is a partially cross-sectional view showing the display device in FIG. 2. Referring to FIG. 2 and FIG. 3, the display device 200 includes a display panel 210, a back light module 220, a printed circuit board 230 and a ground slice 240. The display panel 210 is for example a liquid crystal display panel, and the printed circuit board 230 is suitable for driving the display panel 210 to display the needed frame or dynamic image. The back light module 220 comprises at least one light source 222, a first frame 224 and a second frame 226. The light source 222 is disposed between the first frame 224 and the second frame 226 for providing flat light source for the display panel 210. Particularly, the display panel 210 can be any kind of display panel or a conventional display panel such as a transmissive, a reflective or a transflective display panel. The invention has no limit about this. In this embodiment, the structure of the display panel 210 includes an first substrate 212, a liquid crystal layer 214 and a second substrate 216, wherein the liquid crystal layer 214 is disposed between the first substrate 212 and the second substrate 216. Scan lines, data lines, active elements and pixel electrodes (not shown) are disposed on the second substrate 216, and common electrodes (not shown) are disposed on the first substrate 212. When a driving voltage is formed between the pixel electrodes and the common electrodes, the liquid crystal molecules in the liquid crystal layer 214 are arranged according to the distribution of the electric field.

Besides, the back light module 220 is for example a direct-type back light module or a side-type back light module. The back light module 220 is disposed at the second substrate 216 near the liquid crystal panel 210, and the light generated by the light source 222 is able to be passed through a diffuser or be refracted by a light-guiding plate for being forward to the liquid crystal panel uniformly. The light source 222 is for example a cold cathode fluorescent light, a hot cathode fluorescent light or a light emitting diode.

It is noticed that the printed circuit board 230 is disposed at a side of the back light module 220, and the printed circuit board 230 has a control circuit 232 which fronts the back light module 220. The control circuit 232 can be a timing control circuit with high frequency elements. The timing control circuit can be electrically connected to the data lines of the display panel 210 by a flexible printed circuit 234 of flexible material, and generates a clock signal for a source driving circuit (not shown), such that the source driving circuit generates data signals for the display panel 210 at different time intervals respectively. The difference between the present invention and the conventional technique is that the control circuit and the connector of conventional technique both front the outer frame, not front the back light module. In the present invention, the control circuit 232 and the connector 236 are designed to be on two opposite surfaces of the printed circuit board 230, so that the control circuit 232 is opposite to the back light module 220 and the connector 236 is at the outer side of the printed circuit board 230.

Referring FIG. 3, the first frame 224 of the back light module 220 has a first side plate 224a, and the second frame 226 has a second side plate 226a. The first side plate 224a is between the printed circuit board 230 and the second side plate 226a, and the first side plate 224a has at least an opening S for exposing the control circuit 232 and the second side plate 226a being at two opposite sides of the first side plate 224a respectively. Thus, the ground terminal of the control circuit 232 is able to electrically connected to the second side plate 226a by the ground slice 240 through the opening S, and directly connected to the second frame 226 of the back light module 220 for being grounded without passing through the outer side of the outer frame, such that the signal transmitting path is shortened largely.

In particularly, the first frame 224 of the back light module 220 is for example a hollow plastic frame suitable for encapsulating the periphery of a diffuser or a light-guiding plate, and the second frame 226 is for example a metal frame suitable for containing the light source 222 and other elements. The first side plate 224a of the first frame 224 is opposite to the second side plate 226a of the second frame 226, and is assembled and fixed to the second side plate 226a (by being stuck or locked) for encapsulating the light source 222 and other elements entirely. The first side plate 224a has the opening S formed in advance for containing the ground slice 240, such that the ground slice 240 is directly connected to the second frame 226 of metal material for being grounded. The ground slice 240 is for example a conductive sponge, a conductive silica gel or other appropriate ground materials. Besides, the number of the opening S can be one or more that depends on the arrangement and position of the control circuit 232. The invention has no limit about this.

In this embodiment, the ground terminal of the control circuit 232 is directly connected to the second frame 226 of the back light module 220 through the ground slice 240 for being grounded without passing through the outer side of the outer frame, such that the outer frame of conventional outer frame for grounding is not needed anymore. A frame of other material or the plastic frame suitable for encapsulating the outer frame originally is able to substitute the outer frame, such that the whole structure of the display panel is simplified for decreasing the whole cost of the display device 200.

In summary, the control circuit of the present invention is disposed at a surface of the printed circuit board and fronts the opening of the first side plate, and there is only the connector and the ground circuit disposed on the other surface of the printed circuit board. When the printed circuit board is assembled to the display device, the high frequency signal generated by the control circuit is directly conducted to the second frame of the back light module through the ground slice, such that the signal transmitting path is shortened and the interference from the high frequency signal to other electrical elements is prevented. Thus, the present invention is provided with both practicability and originality.

It will be apparent to those skilled in the art that various modifications and variations may be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display device, comprising:
   a display panel;
   a back light module, comprising at least one light source, a first frame, a second frame, wherein the first frame is opposite to the second frame, the light source is disposed between the first frame and the second frame, the first frame has a first side plate, the second frame has a second side plate, the first side plate is opposite to the second side plate, and the first side plate has at least an opening;
   a printed circuit board, comprising a control circuit, electrically connected to the display panel, wherein the printed circuit board is disposed at a side of the back light module, and the control circuit is disposed at an outer side of the first side plate and the second side plate, such that the control circuit is opposite to the second side plate through the opening; and
   a ground slice, located in the opening and connecting the control circuit and the second side plate so that a ground terminal of the control circuit is electrically connected to the second side plate.

2. The display device as claimed in claim 1, further comprising a flexible printed circuit, electrically connected between the printed circuit board and the display panel.

3. The display device as claimed in claim 1, wherein the control circuit comprises a timing control circuit.

4. The display device as claimed in claim 1, wherein the printed circuit board further has a connector, and the connector and the control circuit are disposed at two opposite surfaces of the printed circuit board.

5. The display device as claimed in claim 1, wherein the first frame is a plastic frame.

6. The display device as claimed in claim 1, wherein the second frame is a metal frame.

7. The display device as claimed in claim 1, wherein the light source is a lamp or a light emitting diode.

8. The display device as claimed in claim 1, wherein the ground slice comprises a conductive sponge.

9. The display device as claimed in claim 1, wherein the ground slice comprises a conductive silica gel.

10. The display device as claimed in claim 1, wherein the display panel comprises a liquid crystal display panel.

11. A display device, comprising:
a display panel;
a back light module, comprising:
at least one light source;
a first frame having a first main plate and a first side plate;
a second frame having a second main plate and a second side plate, wherein the first main plate is opposite to the second main plate, the light source is disposed between the first main plate and the second main plate, the first side plate is extended from the first main plate, the second side plate is extended from the second main plate, the first side plate is opposite to the second side plate, and the first side plate has at least an opening;
a printed circuit board, comprising:
a control circuit; and
a connector, electrically connected to the display panel, wherein the printed circuit board is disposed at a side of the back light module, the control circuit and the connector are disposed at different sides of the printed circuit board, the control circuit is opposite to the second side plate through the opening of the first side plate; and
a ground slice, located in the opening and connecting the control circuit and the second side plate so that a ground terminal of the control circuit is electrically connected to the second side plate.

12. The display device as claimed in claim 11, further comprising a flexible printed circuit, electrically connected between the printed circuit board and the display panel.

13. The display device as claimed in claim 11, wherein the control circuit comprises a timing control circuit.

14. The display device as claimed in claim 11, wherein the first frame is a plastic frame.

15. The display device as claimed in claim 11, wherein the second frame is a metal frame.

16. The display device as claimed in claim 11, wherein the light source is a lamp or a light emitting diode.

17. The display device as claimed in claim 11, wherein the ground slice comprises a conductive sponge.

18. The display device as claimed in claim 11, wherein the ground slice comprises a conductive silica gel.

19. The display device as claimed in claim 11, wherein the display panel comprises a liquid crystal display panel.

* * * * *